United States Patent [19]

Wang

[11] Patent Number: 5,097,162
[45] Date of Patent: Mar. 17, 1992

[54] VARIABLE ANGLE STEPPER MOTOR WITH SPRING MAGNET

[75] Inventor: Ping-Shih Wang, Cheshire, Conn.

[73] Assignee: North American Philips Corporation, New York, N.Y.

[21] Appl. No.: 447,962

[22] Filed: Dec. 7, 1989

Related U.S. Application Data

[63] Continuation-in-part of Ser. No. 412,702, Sep. 26, 1989, Pat. No. 4,973,866.

[51] Int. Cl.$^5$ .................... H02K 37/14; H02K 37/00
[52] U.S. Cl. .............................. 310/49 R; 310/156; 310/162
[58] Field of Search ............. 335/231, 254; 310/49 R, 310/156, 162, 163, 164, 165

[56] References Cited

U.S. PATENT DOCUMENTS

| | | |
|---|---|---|
| 4,500,861 | 2/1985 | Nelson ................................ 335/253 |
| 4,599,664 | 7/1986 | Schuh ............................ 310/49 R X |
| 4,973,866 | 11/1990 | Wang ................................ 310/49 R |

FOREIGN PATENT DOCUMENTS

| | | | |
|---|---|---|---|
| 0092759 | 4/1987 | Japan ................................ 310/49 R |
| 0118753 | 5/1987 | Japan ................................ 310/49 R |

OTHER PUBLICATIONS

IBM Technical Disclosure Bulletin, vol. 18, #6, p. 1907, Nov. 1975.

Primary Examiner—Steven L. Stephan
Assistant Examiner—Judson H. Jones
Attorney, Agent, or Firm—Robert J. Kraus

[57] ABSTRACT

A stepper motor, having a permanent magnet rotor rotatably mounted within the annulus of a stator winding, also has a rotatable spring magnet and a stationary bias magnet. The spring magnet is attached to the rotor and is disposed adjacent the stationary bias magnet. When the stator winding is not energized, the rotor assumes a home position established by the spring and bias magnets. When the stator winding is energized, the rotor is rotated away from the home position by an angular displacement determined by the winding current.

9 Claims, 4 Drawing Sheets

VARIABLE ANGLE STEPPER MOTOR WITH SPRING MAGNET

CROSS-REFERENCE TO RELATED APPLICATION

This is a continuation-in-part of U.S. Patent application Ser. No. 412,702 filed on Sept. 26, 1989, now U.S. Pat. No. 4,973,866 which is hereby incorporated by reference.

BACKGROUND OF THE INVENTION

1. Field of the Invention

This invention relates to a permanent magnet stepper motor, and in particular to such a motor for controllably moving a rotor to variable angle rotational positions.

2. Description of Related Art

A stepper motor is a versatile device having many different uses. For example, a stepper motor can be operated as a synchronous motor powered by pulses of electrical current in such applications as clocks, meters, timing devices and recorders. Such a motor can also be pulsed at will to effect predetermined increments of movement of elements such as print heads and paper feeders in printers. A stepper motor can also be pulsed at variable speeds to drive apparatus such as a pump which must be operated at variable flow rates.

A typical permanent magnet stepper motor is a one or two phase device comprising a rotor disposed for rotation around a central axis within an annular stator. The rotor includes around its circumference a permanently magnetized region which successively forms a number of North-South pole pairs. For each phase, the stator includes first and second joined field cups containing a winding of insulated wire surrounding a plurality of magnetizable pole pieces corresponding in number to the magnetic poles in the rotor.

For each phase, the pole pieces of the first field cup are angularly displaced from those of the second field cup to effect a rotational force on the rotor when electrical current is passed through the windings. By controlling the timing and polarities of current pulses passed through the windings, the rotor can be controllably stepped through discrete rotational movements. Further details of typical stepper motor structure, operation and drive circuitry can be obtained from a publication entitled AIRPAX Stepper Motor Handbook published by Airpax Corporation, 604 West Johnson Avenue, P.O. Box 590, Cheshire, CT, U.S.A.

One limitation of conventional single phase stepper motors is their inability to vary the rotational positions to which the rotor is stepped. Both the direction and the speed of rotation of the rotor are electrically controllable, but the discrete rotational positions to which the rotor can be positioned are fixed by the positions of the stator pole pieces. In some applications, it is desirable to electrically control the angular separation between the positions to which the rotor can be rotated, as well as the speed and direction of rotation. This capability would enable the user to electrically adjust the angle of rotation to match his needs and to change the angle at will. Some examples of such applications are motors for powering scanner mirrors in laser scanner devices and for powering strip chart recorders.

SUMMARY OF THE INVENTION

It is an object of the invention to provide a stepper motor in which the rotor can be rotated to selectable positions by passing respective predetermined currents through a stator winding.

It is another object of the invention to provide a stepper motor in which at least one of the selectable positions can be varied by varying the magnitude of the respective stator winding current.

It is yet another object of the invention to provide a stepper motor in which the angle of rotation separating selectable rotor positions is a function of the stator current.

It is still another object of the invention to provide a stepper motor in which the rotor can be automatically returned to a home position in the absence of any stator current.

In accordance with the invention, a variable angle stepper motor comprises a stator, a permanent magnet rotor, spring magnet means and bias magnet means. The stator defines an orifice having a central axis and includes first and second pole pieces of magnetically permeable material disposed adjacent different sectors of a peripheral region of the orifice. An electrically conductive winding is arranged in the stator for inducing magnetic North and South poles in the first and second pole pieces.

The permanent magnet rotor is mounted for rotation around the axis and has at least a portion thereof disposed within the stator orifice in proximity to the pole pieces. The rotor is magnetized such that it has a North pole in a first sector thereof and a South pole in a second sector thereof. Each of the poles has radially extending magnetic field lines.

The spring magnet means is mounted for rotation around the axis with the rotor and is magnetized such that it also has a North pole in a first sector thereof and a South pole in a second sector thereof. Each of these poles has axially extending magnetic field lines.

The bias magnet means is disposed around the axis adjacent one side of the spring magnet means and is magnetized such that it has a North pole in a first sector thereof and a South pole in a second sector thereof. Each of these poles also has axially extending magnetic field lines.

Both the magnetic field strengths and the angular positions of the North-South poles in the spring and bias magnet means are predetermined to predictably influence the rotational position of the rotor and to make the position dependent on the magnitude of the electric current passing through the winding.

In one particularly advantageous embodiment of the invention, the magnetic fields produced by the stator, the rotor, the spring magnet means and the bias magnet means each have only one North-South pole pair, and the bias magnet means is oriented relative to the stator such that their respective poles are angularly separated by 90 degrees.

In a preferred form of the invention, the stator includes first and second cup shaped members of magnetically permeable material each having a central opening substantially coextensive with the orifice. The first and second pole pieces are formed by respective arcuate portions of the cup shaped members which are disposed adjacent different sectors of a peripheral region of the orifice. The members are dimensioned and fitted together to form an annular space surrounding the pole pieces and to form a magnetic field gap between the pole pieces. The stator winding is arranged within the annular space for inducing magnetic North and South poles in the first and second pole pieces, respectively, when an electric current is passed through the winding in a first direction, and for inducing opposite poles in the pole pieces when the current is passed through the winding in the opposite direction.

DESCRIPTION OF THE PREFERRED EMBODIMENTS

Figure 1:
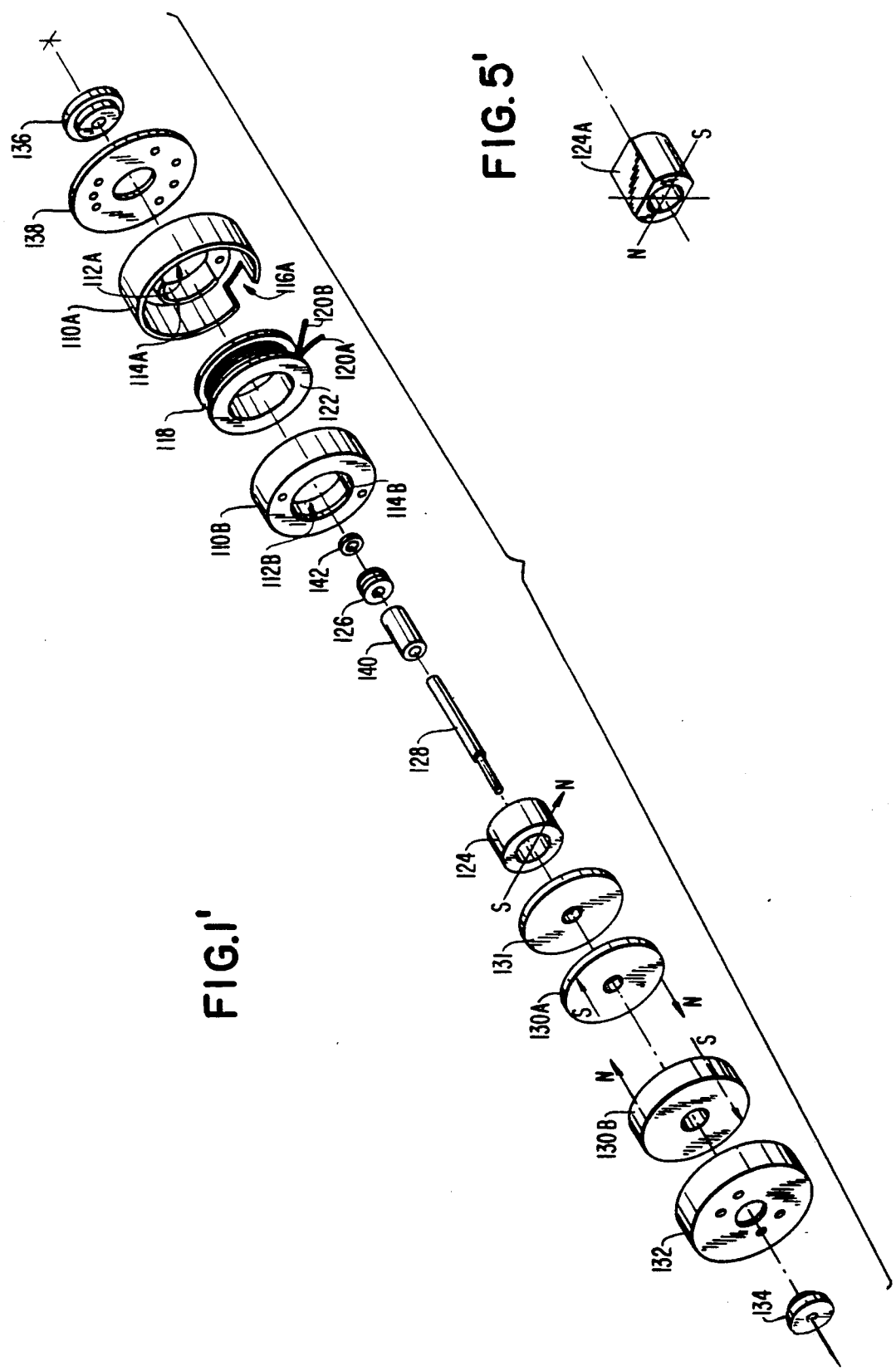
FIG. 1' is an exploded view of a stepper motor in accordance with the invention, showing the arrangement of the of the motor along a central axis X'—X'.

By referring to FIGS. 1', 2' and 3a' together, which are drawn substantially to scale, the assembly and construction of a preferred embodiment of the variable angle stepper motor can be readily understood.

All of the parts of the stepper motor are arranged along and centered on the central axis X'—X'. An outer field cup 110A and an inner field cup 110B disposed within the outer cup collectively form a stator housing at one end of the motor. Alternatively the field cups could be joined at abutting edges, but the arrangement shown in the drawing is simpler to assemble. The field cups are stamped or otherwise made from a magnetically permeable material, such as cold rolled steel, and include respective central openings 112A, 112B and respective arcuate portions forming pole pieces 114A, 114B. The field cups also include aligned notches, of which only one (116A) is visible in FIG. 1. In the assembled stator housing, these notches define an opening for wire leads of a stator winding.

Figure 3A:
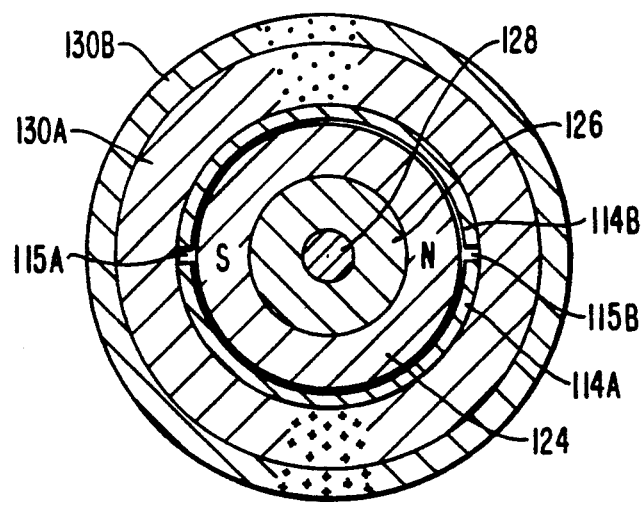
FIGS. 3a', 3b' and 3c' are sectional views of the stepper motor taken along the line III'—III' of FIG. 2', each view showing the rotor position during a different mode of stator energization.

As can be best seen from FIG. 3a', the pole pieces 114A, 114B each extend through an arc of slightly less than 180 degrees, are in opposite sectors of the illustrated circular cross section, and are separated by gaps 115A, 115B. These pole pieces, together with peripheral and side walls of the outer and inner field cups, define a substantially closed annular space in which a stator winding 11 is disposed. This winding comprises a coil of insulated electrical wire, such as magnet wire, terminating in leads 120A, 120B wound around a bobbin 122 of electrically insulating material such as nylon. These leads extend through the stator housing opening defined by the notches 116A (shown) and 116B (not shown).

The rotor of the stepper motor comprises an elongate annular part 124 of a permanently magnetized material such as ferrite or alnico, which is affixed to a hub 126 of a rigid material, such as aluminum or cold rolled steel, by means of an epoxy 125. The hub 126 is affixed to a nonmagnetic stainless steel shaft 128 by means of an adhesive or press fit. The permanently magnetized annular part 124 has a single North pole and a single South pole, which are located in diametrically opposite sectors of the previously mentioned circular cross section. As indicated by the arrow passing through part 124, the magnetic field lines at the poles extend radially from the poles.

The axial length of the annular part 124 is substantially equal to that of the stator housing formed by the field cups 110A, 110B, and this magnetized part is contained within an orifice of the stator housing defined by the arcuate pole pieces 114A, 114B of the field cups. Also affixed to the shaft, by means of an adhesive or holding means, are a disc shaped spring magnet 130A of a permanently magnetized material such as ferrite or alnico and a disc shaped magnetic isolator 131 of a magnetically permeable material such as cold rolled steel. As indicated in FIG. 1' by the arrows leaving and entering the spring magnet 130A, this magnet has North and South poles with axially extending magnetic field lines in diametrically opposite sectors. The isolator 131 intercepts and returns to its source magnetic field lines originating from the rotor magnet 124 and the spring magnet 130A, thereby effectively isolating each of these magnets from the magnetic field of the other.

An annular bias magnet 130B is affixed to an inner surface of the mounting cup 132 by means of an adhesive or a press fit. The mounting cup has a peripheral edge which abuts a corresponding edge of the outer field cup 110A and surrounds a peripheral portion of the inner field cup 110B. Depending on whether magnetic shielding is desired, the mounting cup may be manufactured from a magnetic material, such as cold rolled steel, or from a nonmagnetic material, such as aluminum or plastic.

The bias magnet 130B is formed of a permanently magnetized material, such as ferrite or alnico, and is disposed immediately adjacent the spring magnet 130A. The bias magnet has a single North pole and a single South pole which are located in diametrically opposite sectors of the magnet and have axially extending field lines as illustrated by the N-S arrows illustrated in FIG. 1'. The magnetic field lines passing through the bias magnet and the spring magnet at their North and South poles are depicted in FIGS. 3a'-3c' by dots and crosses. The dots represent magnetic field lines leaving the drawing sheet and the crosses represent magnetic field lines entering the drawing sheet. As can be seen from these dots and crosses, the North and South poles of the bias magnet 130B are angularly displaced from the gaps 115A, 115B separating the stator pole pieces by approximately ninety degrees.

The rotor is rotatably mounted in the stepper motor by means of sintered bronze bearings 134, 136 into which opposite ends of the shaft 128 extend. Bearing 134 is mounted in a central opening in the mounting cup 132 and bearing 136 is mounted in a central opening in a disc shaped mounting plate 138 of any rigid material. Typically, the mounting plate is made of cold rolled steel and is affixed to an end surface of the outer field cup 110A by means of staking, spot welding or riveting. A plastic spacer 140 and a washer 142, preferably of nonmagnetic material such as a plastic or stainless steel, are disposed on the shaft 128 on opposite sides of the hub 126 to axially position the annular part 124 within the motor and to prevent opposite ends of the annular part from rubbing against other parts of the motor.

Figure 2:
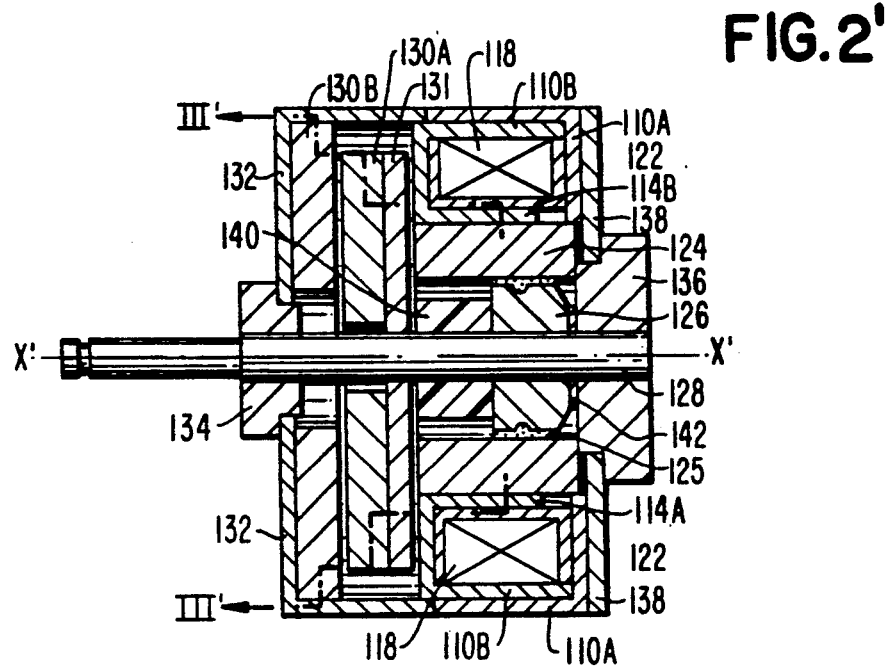
FIG. 2' is a sectional view of the stepper motor of FIG. 1', formed by cutting the motor with a plane containing the central axis X'—X'.
Figure 4A:
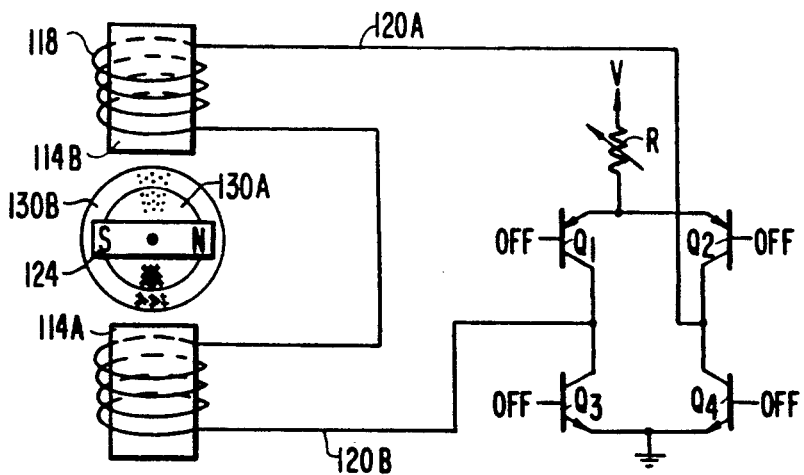
FIGS. 4a', 4b' and 4c' are schematic representations of the different modes of stator energization for which the rotor positions in FIGS. 3a', 3b' and 3c' result.

Operation of the stepper motor can be best understood by referring to FIGS. 2', 3' and 4'. FIG. 2' shows the structural interrelationship of the electromagnetic parts of the motor. FIGS. 3a', 3b', 3c' illustrate the rotational positions of the rotor for three different electromagnetic conditions. Corresponding FIGS. 4a',4b',4c' schematically illustrate the operation of a stator winding drive circuit for the three conditions. This drive circuit includes four transistors Q1, Q2, Q3, Q4 which are electrically connected to the leads 120A, 120B of the winding.

In the first condition, represented by FIGS. 3a' and 4a', all of the transistors are biased OFF (in a non-conducting state) and no current passes through the stator winding 118. No magnetic field is induced in the stator field cups 110A, 110B, and the position of the rotor is determined solely by the magnetic fields permanently produced by the spring magnet 130A and the bias magnet 130B. As is illustrated, the spring magnet has rotated to a position where the magnetic field lines produced thereby align with those of the stationary bias magnet, causing the attached rotor to rotate to the indicated position where its North and South poles align with the gaps 115B and 115A, respectively, separating the pole pieces 114A,114B of the stator, opposite polarity South and North poles, respectively, of the bias magnet.

Figure 3B:
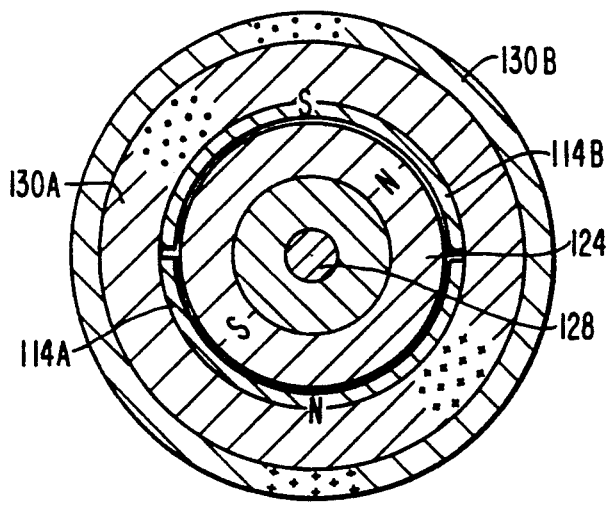

In the second condition, represented by FIGS. 3b' and 4b', transistors Q1, Q4 are biased OFF, transistors Q2, Q3 are biased ON (in a saturated, fully conducting state) and a current I+ passes through the stator winding 118 in the direction indicated by the arrowheads. The current I+ passing through the winding induces in the stator field cups a magnetic field having North and South poles in the pole pieces 114A and 114B, respectively. The attractive force of the induced poles causes the rotor to rotate in a counter clockwise direction toward a position wherein its North and South poles would align with the opposite polarity South and North poles induced in the stator pole pieces. However, as the rotor rotates away from the position shown in FIG. 3a' it causes the poles of the attached spring magnet to rotate away from the attracting poles of the bias magnet, such that the concentrated field lines passing through the poles of these magnets no longer align. Magnet 130A acts like a spring and attempts to rotate the attached rotor in a clockwise direction to the position illustrated in FIG. 3a', where the polar fields align. As a result of the opposite rotary forces applied to the rotor shaft 128 by the rotor magnet 124 and the spring magnet 130A, the rotor comes to rest at an equilibrium position at an angle $+\alpha$. This angle can be adjusted to any desired value from near 0 degrees to almost $+90$ degrees by simply adjusting the magnitude of the current I+, thereby adjusting the rotary force imposed on the rotor magnet by the magnetic field induced in the stator pole pieces. In the illustrated embodiment, this could be done by adjusting the resistance of a variable resistor R which is electrically connected in series with the transistor circuit and a constant source of potential V.

Figure 3C:
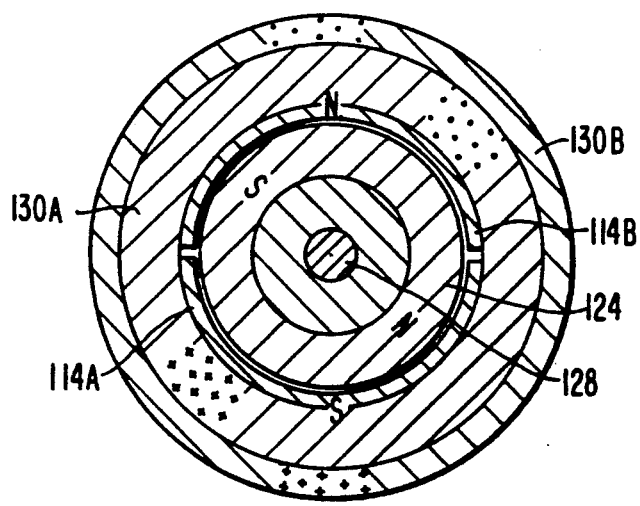

In the third condition, represented by FIGS. 3c' and 4c', transistors Q1 and Q4 are biased ON, transistors Q2 and Q3 are biased OFF, and a current I− passes through the stator winding 118 in the opposite direction, as indicated by the arrowheads. The current I− passing through the winding induces in the stator field cups a magnetic field having North and South poles in the stator pole pieces 114B and 114A, respectively. Now, the attractive force of the induced poles causes the rotor to rotate in a clockwise direction toward a position where its poles align with the opposite polarity poles induced in the stator pole pieces. Conversely, attached spring magnet 130A attempts to rotate the rotor in a counter clockwise direction to effect alignment of the spring and bias magnet fields. As a result of these opposite rotary forces, the rotor comes to rest at an equilibrium position at an angle $-\alpha$. This angle can be adjusted to any desired value from near 0 degrees almost $-90$ degrees by simply adjusting the magnitude of the current I−, again by adjusting the resistance R. This adjustment will also affect the angle $+\alpha$, unless an alternative circuit arrangement is utilized which provides separate adjustments for the two currents.

Figure 4B:
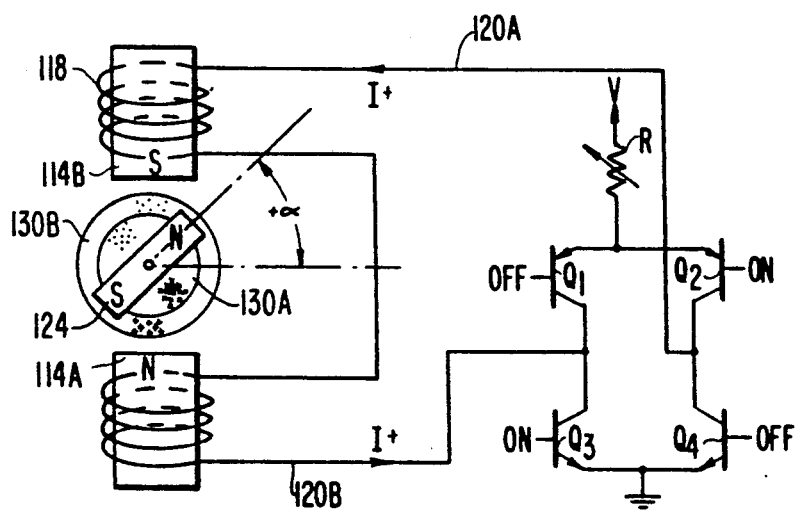
Figure 4C:
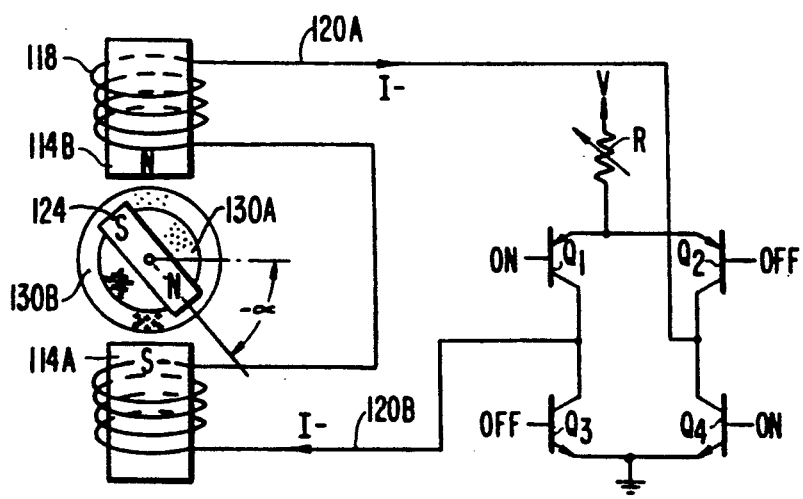

The above described stepper motor is merely illustrative of one embodiment of the invention, and many alternative forms and variations are possible. For example, the drive circuit illustrated in FIG. 4' could be replaced with a circuit which selectively passes through the stator winding a plurality of different current magnitudes. By choosing the current magnitudes to correspond to predetermined angular positions, the circuit could be utilized to controllably step the rotor to the positions.

In another alternative embodiment, the annular rotor part 124 is replaced with a bar magnet part 124A, as illustrated in FIG. 5'. Part 124A is generally rectangular in cross section, but has two curved diametrically opposed surfaces with radii corresponding to that of the circular outer surface of part 124. In comparison to an annular part, such a bar magnet part can be more precisely magnetized in predefined polar sectors. However, a larger number of pole pairs can be provided in an annular part. In this regard, note that either or both of the annular rotor part 124 and the bias magnet 130B may be provided with a plurality of pole pairs.

It might also be desirable to add one or more mechanical stops to the motor to limit angular movement and prevent overshoot of the shaft beyond predetermined angular limits. Such a feature could be added to protect an apparatus powered by the shaft in the event the winding is improperly driven.

I claim:
1. A variable angle stepper motor comprising:
   a. a stator defining an orifice having a central axis and including
      (1) first and second pole pieces of magnetically permeable material disposed adjacent different sectors of a peripheral region of the orifice;
      (2) an electrically conductive winding arranged for inducing magnetic North and South poles in the first and second pole pieces, respectively, when an electric current is passed through the winding;
   b. a permanent magnet rotor mounted for rotation around the axis and having at least a portion thereof disposed within the stator orifice in proximity to the pole pieces, said rotor having a magnetic North pole in a first sector thereof and a magnetic South pole in a second sector thereof, each of said poles having radially extending magnetic field lines;
   c. spring magnet means mounted for rotation around the axis with the rotor and having a magnetic North pole in a first sector thereof and a magnetic South pole in a second sector thereof, each of said poles having axially extending magnetic field lines; and
   d. bias magnet means disposed around the axis adjacent one side of the spring magnet means and having a magnetic North pole in a first sector thereof and a magnetic South pole in a second sector thereof, each of said poles having axially extending magnetic field lines;

said spring and bias magnet means having predetermined magnetic field strengths and predetermined angular positions of their respective North and South poles for predictably influencing the rotational position of the rotor and making said rotor position dependent on the magnitude of the electric current passing through the winding.

2. A variable angle stepper motor as in claim 1 where the orifice is located in a region substantially surrounded by the pole pieces.

3. A variable angle stepper motor as in claim 1 where the stator has only two of said pole pieces and where the rotor, the spring magnet means and the bias magnet means each have only one North-South pole pair.

4. A variable angle stepper motor as in claim 3 where the bias magnet means is oriented relative to the stator such that the North-South poles induced in said pole pieces are angularly separated by ninety degrees from the respective North-South poles in the bias magnet means.

5. A variable angle stepper motor as in claim 4 where the spring magnet means is affixed to the rotor and is separated therefrom by magnetic field isolation means.

6. A variable angle stepper motor comprising:
   a. a stator defining an orifice having a central axis and including:
      (1) first and second cup shaped members of magnetically permeable material, each member having a central opening substantially coextensive with the orifice and having respective arcuate portions defining first and second pole pieces disposed adjacent different sectors of a peripheral region of the orifice, said cup shaped members being dimensioned and fitted together to form an annular space surrounding the pole pieces and to form a magnetic field gap between the first and second pole pieces;
      (2) an electrically conductive winding arranged within the annular space for inducing magnetic North and South poles in the first and second pole pieces, respectively, when an electric current is passed through the winding in a first direction and for inducing magnetic South and North poles in the first and second pole pieces, respectively, when an electric current is passed through the winding in a second direction opposite to said first direction;
   b. a rotor mounted for rotation around the axis and including an elongate permanently magnetized annular part disposed within the stator orifice in proximity to the pole pieces, said annular part having a magnetic North pole in a first sector thereof and a magnetic South pole in a second sector thereof;
   c. a spring magnet disposed around the axis and mounted for rotation with the rotor, said spring magnet having a magnetic North pole in a first sector thereof and a magnetic South pole in a second sector thereof, each of said poles having axially extending magnetic field lines;
   d. magnetic isolation means separating the rotor and the spring magnet for mutually isolating the magnetic fields of said rotor and said spring magnet; and
   e. a bias magnet disposed around the axis adjacent one side of the annular spring magnet and having a magnetic North pole in a first sector thereof and a magnetic South pole in a second sector thereof, each of said poles having axially extending magnetic field lines;

said spring and bias magnets having predetermined magnetic field strengths and predetermined angular positions of their respective North and South poles for predictably influencing the rotational position of the rotor and making said rotor position dependent on the direction and magnitude of the electric current passing through the winding.

7. A variable angle stepper motor as in claim 6 where the stator has only two of said pole pieces and where the rotor, the annular spring magnet and the annular bias magnet each have only one North-South pole pair.

8. A variable angle stepper motor as in claim 7 where the annular bias magnet is oriented relative to the stator such that the North-South poles induced in said pole pieces are angularly separated by ninety degrees from the respective North-South poles in the annular bias magnet.

9. A variable angle stepper motor as in claim 6 where one of said first and second cup shaped members is disposed within the other.

* * * * *